(12) United States Patent
Muniere

(10) Patent No.: US 9,999,027 B2
(45) Date of Patent: *Jun. 12, 2018

(54) METHOD FOR ALLOCATING RESOURCES IN PACKET MODE IN A MOBILE RADIO SYSTEM

(71) Applicant: Alcatel Lucent, Boulogne Billancourt (FR)

(72) Inventor: Vincent Muniere, Meudon (FR)

(73) Assignee: Alcatel Lucent, Boulogne-Billancourt (FR)

( * ) Notice: Subject to any disclaimer, the term of this patent is extended or adjusted under 35 U.S.C. 154(b) by 44 days.

This patent is subject to a terminal disclaimer.

(21) Appl. No.: 14/553,232

(22) Filed: Nov. 25, 2014

(65) Prior Publication Data

US 2015/0146651 A1 May 28, 2015

Related U.S. Application Data

(63) Continuation of application No. 10/634,766, filed on Aug. 6, 2003, now Pat. No. 8,903,406.

(30) Foreign Application Priority Data

Aug. 14, 2002 (FR) ..................... 02 10323

(51) Int. Cl.
*H04W 72/04* (2009.01)
*H04W 36/12* (2009.01)
*H04L 29/06* (2006.01)

(52) U.S. Cl.
CPC .......... *H04W 72/04* (2013.01); *H04L 69/163* (2013.01); *H04W 72/0413* (2013.01);
(Continued)

(58) Field of Classification Search
CPC ....... H04W 72/04; H04W 76/00; H04W 8/00; H04W 8/02; H04W 8/18; H04W 88/00; H04W 88/06; H04W 4/00; G06F 3/04883
(Continued)

(56) References Cited

U.S. PATENT DOCUMENTS 6,647,262 B1 11/2003 Demetrescu et al.
6,813,280 B2 11/2004 Vanttinen et al.
(Continued)

OTHER PUBLICATIONS

"Digital cellular telecommunication system (Phase 2+); General Packet Radio Service (GPRS); Mobile Station (MS)-Base Station System (BSS) interface; Radio Link Control/Medium Access Control (RCL/MAC) protocol (GSM 04.60 version 8.15.0 Release 1999)" ETSI TS 101 349 V8.15.0, Jul. 2002, pp. 1-32, 37-47,115,146,149,259, 267-270, XP002240614.
(Continued)

*Primary Examiner* — Warner Wong
(74) *Attorney, Agent, or Firm* — Chiesa Shahinian & Giantomasi, PC

(57) ABSTRACT

A mobile station in a mobile radio system can send different types of packet mode resource requests to a network, corresponding to different transfer modes that can be supported by the mobile station, a mobile station being able to use one or the other of request types corresponding to transfer modes that it supports, in accordance with its requirements. In a method of allocating packet mode resources in the mobile radio system, for signaling data transfer in the uplink direction, the signaling being liable to generate an allocation of packet mode resources in the uplink direction for user data transfer, a mobile station uses a type of packet mode resource request corresponding to a transfer mode best suited to the requirements of the user data transfer.

9 Claims, 4 Drawing Sheets

(52) U.S. Cl.
CPC ............. *H04L 69/16* (2013.01); *H04W 36/12* (2013.01); *H04W 72/0426* (2013.01)

(58) Field of Classification Search
USPC ................... 370/252, 328, 338, 464, 465
See application file for complete search history.

(56) References Cited

U.S. PATENT DOCUMENTS

| | | | |
|---|---|---|---|
| 6,842,462 | B1 | 1/2005 | Ramjee et al. |
| 6,870,858 | B1 | 3/2005 | Sebire |
| 6,879,832 | B1* | 4/2005 | Palm .................. H04W 76/021 370/328 |
| 7,050,824 | B2 | 5/2006 | Masseroni et al. |
| 7,054,268 | B1* | 5/2006 | Parantainen ............ H04L 69/32 370/231 |
| 7,158,495 | B2 | 1/2007 | Jei |
| 7,181,223 | B1 | 2/2007 | Pecen et al. |
| 7,197,050 | B2* | 3/2007 | Lucidarme ............ H04L 1/0026 370/417 |
| 7,302,251 | B2 | 11/2007 | Barany et al. |
| 7,787,884 | B2* | 8/2010 | Muniere ................ H04L 47/15 455/452.2 |
| 8,903,406 | B2* | 12/2014 | Muniere ........... H04W 72/0413 455/436 |
| 2001/0030949 | A1 | 10/2001 | Molno et al. |
| 2001/0038614 | A1 | 11/2001 | Hautamaki et al. |
| 2002/0044527 | A1 | 4/2002 | Jiang et al. |
| 2002/0061756 | A1 | 5/2002 | Bleckert et al. |
| 2002/0080758 | A1 | 6/2002 | Landais |
| 2002/0085516 | A1 | 7/2002 | Bridgelall |
| 2002/0118662 | A1 | 8/2002 | Sheynman et al. |
| 2002/0123370 | A1 | 9/2002 | Berg et al. |
| 2002/0126630 | A1* | 9/2002 | Vanttinen .......... H04W 72/0413 370/328 |
| 2002/0137522 | A1 | 9/2002 | Landais et al. |
| 2002/0137532 | A1 | 9/2002 | Landais et al. |
| 2002/0150091 | A1 | 10/2002 | Lopponen et al. |
| 2002/0155853 | A1 | 10/2002 | Lee et al. |
| 2004/0228318 | A1* | 11/2004 | Bourdeaut ............ H04L 1/0001 370/349 |
| 2007/0197255 | A1* | 8/2007 | Subramanian ........ H04W 28/18 455/552.1 |
| 2009/0257417 | A1* | 10/2009 | Allen .................. H04W 76/041 370/338 |

OTHER PUBLICATIONS

Balachandran K. et al: "MAC layer design for statistical multiplexing of voice and data over EGPRS" IEEE, vol. 2, Sep. 23, 2000, pp. 913-923, XP010532374.

TCR over Second (2.5G) and Third (3G) Generation Wireless Networks; Network Working Group; Internet Draft; draft-ietf-pilc-2.5g3g-10; Network Working Group; Internet Draft, Jul. 1, 2002, pp. 1-29, CP002240615.

H. Affifi, CH. E. Perkins, H. Flinck, L. Morand: Internet General Packet Radio Service (GPRS) Service Description; Mobile IP Working Group Internet Draft; draft-hossam=igprs.01.txt Mobile IP working Group Internet Draft; Feb. 13, 2002, pp. 1-31, XP002240617.

* cited by examiner

METHOD FOR ALLOCATING RESOURCES IN PACKET MODE IN A MOBILE RADIO SYSTEM

CROSS-REFERENCE TO RELATED APPLICATIONS

This application is a continuation of U.S. patent application Ser. No. 10/634,766, filed Aug. 6, 2003, which claims priority to French Patent Application No. 02 10 323, filed Aug. 14, 2002, the disclosures of which are hereby incorporated by reference in their entirety.

BACKGROUND OF THE INVENTION

Field of the Invention

The general field of the present invention is that of mobile radio systems.

The more particular field of the present invention is that of packet mode services, such as the General Packet Radio Service (GPRS), especially for Global System for Mobile communications (GSM) mobile radio systems.

Description of the Prior Art

Generally speaking, the above systems are covered by standards, and for more information reference may be made to the corresponding standards published by the corresponding standardization organizations.

The architecture of packet mode systems, such as GPRS systems, for example, is outlined in FIG. 1, and essentially comprises:
- a base station subsystem (BSS) communicating with mobile stations (MS) and including base transceiver stations (BTS) and base station controllers (BSC),
- a GPRS network subsystem connected to the BSS and to external networks (not shown), and including GPRS network subsystem entities or nodes, such as serving GPRS support nodes (SGSN) and gateway GPRS support nodes (GGSN).

In accordance with the multilayered architecture used to define the above systems, the interface between the MS and the BSS, also known as the radio interface or the "Um" interface, includes:
- a first layer, also known as the physical layer, and
- a second layer, also known as the link layer, which is divided into a plurality of layers, as follows, in increasing level order: a medium access control (MAC) layer, a radio link control (RLC) layer, and a logical link control (LLC) layer, the BSS providing only a relay function between MS and the GPRS network subsystem for the LLC layer.

Similarly, the interface between the BSS and the GPRS network subsystem, also known as the "Gb" interface, includes:
- a first layer, also known as the physical layer, and
- a second layer, also known as the link layer, which is divided into a plurality of layers, as follows, in increasing level order: a network service layer, a BSS GPRS protocol (BSSGP) layer, and a logical link control (LLC) layer, the BSS providing only a relay function between MS and the GPRS network subsystem for the LLC layer.

Frames referred to as LLC frames are formed in the LLC layer from higher level data units which are referred to in the LLC frames as LLC-protocol data units (LLC-PDU).

The LLC-PDUs are then segmented in the RLC/MAC layer to form blocks known as RLC data blocks. The RLC data blocks are then converted to the format required for transmission at the "Um" interface in the physical layer.

Furthermore, procedures are implemented in the RLC and LLC layers for forwarding data (RLC data blocks or LLC-PDU, as appropriate) that has not been received correctly, in accordance with the automatic repeat request (ARQ) technique. The receiver signals the correct or incorrect state of the data blocks or units received to the transmitter by means of acknowledgement (ACK) messages and non-acknowledgement (NACK) messages.

Furthermore, higher level signaling protocols are also provided, in particular for mobility management (MM), session management (SM), etc.

The following description outlines some procedures relating to the RLC/MAC protocol at the interface between the MS and the BSS. For a more complete description of this protocol, see Technical Specification (TS) 04.60 published by the 3rd Generation Partnership Project (3GPP).

In packet mode the logical channels comprise the following channels:
- packet broadcast control channels (PBCCH), used to transmit system information in a cell,
- packet common control channels (PCCCH), in turn comprising the following channels:
  - a packet random access channel (PRACH), used to access the network,
  - a packet paging channel (PPCH), used to page users,
  - a packet access grant channel (PAGCH), used to allocated resources in packet mode,
  - a packet notification channel (PNCH), used to notify mobile stations of a point-to-multipoint call, and
- packet data transfer channels (PDTCH) used to transfer data and packet associated control channels (PACCH) used in particular to transmit acknowledgements (ACK/NACK) or messages connected with allocation/modification of resources in packet mode.

Some packet mode channels, such as the PBCCH and PCCCH in particular, cannot be established in a cell. In this case, the mobile stations in packet mode use circuit mode channels such as the broadcast control channel (BCCH) and the packet common control channel (CCCH), the latter including in particular the random access channel (RACH), the paging channel (PCH), the access grant channel (AGCH), and the notification channel (NCH). To indicate this facility, the notation (P)BCCH is used to refer to the PBCCH and to the BCCH, for example.

In packet mode, a mobile station can be:
- either in a packet transfer mode, in which resources are allocated temporarily when there is actually data to be transmitted during a call, the resources allocated temporarily forming a temporary packet mode connection or temporary block flow (TBF) for a given transmission direction,
- or in a packet idle mode in which no TBF is established.

Generally speaking, data transfer by means of a TBF can be data referred to herein as user data or data referred to herein as signaling data, exchanged in the context of higher level protocols, for example the mobility management (MM) protocol, etc.

An uplink TBF (UL TBF) can be established either on the common control channels (P)CCCH or on the PACCH of a downlink TBF (DL TBF) simultaneously operative for the mobile station concerned.

The establishing of a UL TBF on the common control channels (P)CCCH is initiated by the mobile station sending the network a PACKET CHANNEL REQUEST message on the PRACH (or a CHANNEL REQUEST message on the RACH). Depending on what the mobile station requires for the transfer in question, different causes can be used at the time of a request to establish a UL TBF: one phase access, short access, two phase access, cell update, page response, MM procedure, single block without TBF establishment.

The following steps apply in the case of one phase access or two phase access, for example:

In the case of one phase access, the network responds with an IMMEDIATE ASSIGNMENT message (respectively a PACKET UPLINK ASSIGNMENT message) on the AGCH (respectively the PAGCH), this message indicating directly to the mobile station the packet resources or PDCHs allocated.

In the case of two phase access, the IMMEDIATE ASSIGNMENT (PACKET UPLINK ASSIGNMENT) message on the (P)AGCH allocates the mobile station a radio block for a PDCH, which it can use to transmit a PACKET RESOURCE REQUEST message containing a more precise description of the required packet mode resources. The network then responds with a PACKET UPLINK ASSIGNMENT message indicating to the mobile station the packet mode resources or PDCHs allocated.

In the case of establishing an uplink TBF (UL TBF) on the PACCH of a downlink TBF (DL TBF) operative simultaneously for the mobile station concerned, the network sends the PACKET UPLINK ASSIGNMENT message on the PACCH.

A downlink TBF (DL TBF) can be established either on the common control channels (P)CCCH or on the PACCH of an uplink TBF (UL TBF) operative simultaneously for the mobile station concerned.

In the case of establishing a DL TBF on the common control channels, if the SGSN does not know the cell in which the mobile station is located, it can first initiate a paging procedure in packet mode via the BSCs likely to be controlling that cell. An exchange of signaling on the (P)CCCH then follows, including the mobile station sending a CHANNEL REQUEST message (or PACKET CHANNEL REQUEST message on the PRACH) in response to the paging, followed by the network sending the mobile station a PACKET UPLINK ASSIGNMENT message indicating to the mobile station the packet mode resources or PDCHs allocated, on which the mobile station can send its response to the SGSN. Consequently, having determined the cell in which the mobile station is located, the SGSN can send LLC data units to the corresponding BSC, which then establishes a DL TBF either on the (P)CCCH or on the PACCH of the UL TBF if it is still operative. To establish a DL TBF on a common channel, the BSC sends an IMMEDIATE ASSIGNMENT message on the CCCH or a PACKET DOWNLINK ASSIGNMENT message on the PCCCH, the message indicating to the mobile station the packet mode resources or PDCHs allocated.

In the case of establishing a DL TBF on the PACCH of a UL TBF operative simultaneously for the mobile station concerned, the network sends the PACKET DOWNLINK ASSIGNMENT message on the PACCH.

Moreover, the above systems have a cellular architecture, and handover mechanisms are provided. The following description outlines some procedures relating to these handover mechanisms. For a more complete description of these mechanisms see Technical Specifications (TS) 04.60 and 05.08 published by the 3rd Generation Partnership Project (3GPP).

A procedure known as cell reselection is generally used for packet mode services, and a distinction is generally drawn between a number of cell reselection control modes, corresponding to decreasing degrees of autonomy of the mobile station or, which amounts to the same thing, increasing degrees of control by the network. In the case of the GPRS, for example, the control modes include:

a first control mode NC0 in which the mobile station decides autonomously to effect handover and itself selects the target cell, taking account of the results of measurements that it carries out, a second control mode NC1 in which the mobile station decides autonomously to effect handover and itself selects the target cell, taking account of the results of measurements that it carries out, and also transmits the results of the measurements to the network, and a third control mode NC2 in which the network decides to effect handover and selects the target cell, taking account of measurement results that the mobile station sends it.

Thus the control modes NC0 and NC1 correspond to a mode of cell reselection controlled by the mobile station. In this case, the mobile station itself decides to effect a cell reselection.

The control mode NC2 is also known as cell reselection controlled by the network. In this case, the network instructs the mobile station to effect a cell reselection in a PACKET CELL CHANGE ORDER message containing the identity of the reselected cell.

In any of the control modes, for example NC0, NC1, NC2, once the mobile station has successfully effected the operations necessary to connect it in packet mode to the target reselected cell, it sends the network a cell update message indicating the identity of the target reselected cell using the mobility management (MM) protocol. If the mobile station has no user data to send, it sends the SGSN an empty LLC PDU and uses the "cell update" cause at the time of the request to establish a UL TBF for sending said LLC PDU when the PBCCH is established. If the PBCCH is not established in the cell, the mobile station requests one phase establishment. Alternatively, if the mobile station has user data to transfer in the uplink direction, it must send a packet mode resource request message to request the network to establish a UL TBF. Once the UL TBF has been established, the mobile station must send its user data, which is also interpreted by the SGSN as a cell update. On detecting the cell update, the SGSN can then resume, to the new cell, the transfer of data to the old cell that was interrupted.

Moreover, the GPRS standards have evolved, in particular with the introduction of the Enhanced General Packet Radio Service (EGPRS), which offers bit rates very much higher than those offered by the GPRS, thanks to modulation techniques that are more spectrum efficient.

Nevertheless, not all the mobile stations and all the cells in the same system necessarily support the EGPRS. The following description outlines some procedures enabling the GPRS and the EGPRS to coexist in the same system. For more complete description of these procedures reference may be made to the Technical Specification (TS) 04.60 published by the 3rd Generation Partnership Project (3GPP).

There are two modes for a TBF, namely a GPRS mode and an EGPRS mode. Moreover, if a mobile station has a UL TBF and a DL TBF operative simultaneously, then the two TBF must be in the same mode, either the GPRS mode or the EGPRS mode.

Moreover, as the packet mode resource request messages previously referred to, namely the PACKET CHANNEL REQUEST message and the CHANNEL REQUEST message, do not themselves indicate if the mobile station supports the EGPRS, a new packet mode resource request message, namely the EGPRS PACKET CHANNEL REQUEST message, has been introduced.

Not all the cells necessarily support the EGPRS PACKET CHANNEL REQUEST message, and support for this message in a cell is indicated in system information broadcast in the cell on the (P)BCCH.

The EGPRS PACKET CHANNEL REQUEST message can be sent on the (P)CCCH. A mobile station sending this message in itself indicates that the mobile station supports the EGPRS. The only way for the network to know if a mobile station supports the EGPRS at the time of establishing a UL TBF on the (P)CCCH is to receive the EGPRS PACKET CHANNEL REQUEST message. The network can then establish a UL TBF in the EGPRS mode. If not, the network can only establish a TBF in the GPRS mode.

According to the current version of the standard, the packet mode resource request messages are used in the following circumstances:
 if the cell supports the EGPRS PACKET CHANNEL REQUEST message:
  if the mobile station requires to effect a one phase access, a two phase access, or a short access, it uses the EGPRS PACKET CHANNEL REQUEST message (with the appropriate cause),
  if the mobile station wishes to effect a cell update, to send a packet mode page response, to execute a mobility management (MM) procedure, or to request the allocation of a single block without TBF establishment, it uses the CHANNEL REQUEST message (if the PBCCH is not present in the cell) or the PACKET CHANNEL REQUEST message (if the PBCCH is present in the cell),
 if the cell does not support the EGPRS PACKET CHANNEL REQUEST message the mobile station uses the CHANNEL REQUEST message or the PACKET CHANNEL REQUEST message in all circumstances.

The EGPRS is especially beneficial for applications such as Internet access in particular. In this kind of application, the user data transferred is exchanged in accordance with the Transmission Control Protocol (TCP) which is itself defined in accordance with the Transmission Control Protocol/Internet Protocol (TCP/IP) model. A typical situation in this kind of application corresponds to a downlink TBF established in the EGPRS mode for transferring user data and an uplink TBF established from time to time, also in the EGPRS mode, for transmitting TCP acknowledgements (TCP ACKs).

In this kind of application in particular, the current version of the standard gives rise to problems that we have recognized and are explained next.

The examples shown in FIGS. 2 and 3 consider an initial state, which is denoted 1 in FIGS. 2 and 1' in FIG. 3, and corresponds to a situation of this kind in which a transfer of data is in progress between an equipment corresponding to a mobile station (MS) and an equipment corresponding to a BSS, in this example the BSS of an old cell, prior to handover. TCP segments, or data units exchanged in accordance with the TCP, are transmitted in the downlink direction, and these TCP segments are identified by a sequence number and TCP acknowledgements (TCP ACKs) and are then transmitted in the uplink direction, the acknowledgements being identified by their ACK number.

Consider next the handover situation, in which either the MS has decided on cell reselection (mode NC0 or NC1) or the network has instructed the MS to effect cell reselection (mode NC2). This situation is also one in which the MS has successfully effected the operations necessary to connect to the new (reselected) cell (corresponding to the BSS(new cell) equipment). The corresponding state is denoted 2 in FIGS. 2 and 2' in FIG. 3. Consider further the situation of a new (or reselected) cell which supports the PBCCH and the EGPRS PACKET CHANNEL REQUEST message (note, however, that the scenarios explained apply equally well to the situation in which there is no PBCCH in the cell).

In the current version of the standard, there are two scenarios available for resuming, to the new cell, the transfer to the old cell that was interrupted.

A first scenario corresponds to the situation in which the MS still has one or more LCC PDU(s) to send to the network (corresponding to TCP ACKs that were not sent in the old cell).

This first scenario corresponds to the example shown in FIG. 2. In that example, before changing to state 2, TCP segments with sequence numbers "n" and "n+1" have been transmitted in the downlink direction and a TCP ACK having the number "n+1" has been transmitted in the uplink direction, while the TCP ACK having the number "n+2" has not yet been transmitted.

In this situation, to transmit to the network the TCP ACK having the number "n+2", the MS requests a short access (or a one phase access) by means of the EGPRS PACKET CHANNEL REQUEST message, as shown at 21. In this way, the BSS(new cell) knows that the MS supports the EGPRS. The BSS(new cell) can then allocate a UL TBF in the EGPRS mode, as shown at 22, by sending a PACKET UPLINK ASSIGNMENT message, and can then resume the transfer in the downlink direction in the EGPRS mode.

The MS then forwards the TCP ACK with the number "n+2" to the BSS(new cell), as shown at 23. The BSS(new cell) forwards the TCP ACK to the SGSN, as shown at 24, and this serves as a cell update for the SGSN. As shown at 25, the SGSN then sends a FLUSH-LL message that commands the BSS(old cell) to reroute to the BSS(new cell) the LCC PDU(s) not yet transmitted in the downlink direction. The BSS(old cell) then sends a FLUSH-LL ACK message to the SGSN, as shown at 26.

To resume the transfer in the downlink direction, the BSS(new cell) then sends the MS a PACKET DOWNLINK ASSIGNMENT message, as shown at 27, advising the MS of the packet mode resources allocated to it, in this instance in the EGPRS mode. Transfer between the MS and the BSS(new cell) can then be resumed in the new cell, as shown at 28, where a TCP segment having the sequence number "n+2" is transmitted in the downlink direction and a TCP ACK having the number "n+3" is transmitted in the uplink direction.

A second scenario corresponds to the situation in which the MS has no LLC PDUs to send.

This second scenario corresponds to the example shown in FIG. 3. In this example, before going to the state 2', TCP segments having sequence numbers "n" and "n+1" have been transmitted in the downlink direction and TCP ACKs having the numbers "n+1" and "n+2" have been transmitted in the uplink direction.

In this case, a shown at 21', the MS requires a UL TBF to send a cell update message, and according to the current version of the standard, the MS can do this only by means of the CHANNEL REQUEST message (with the "one phase access" cause) or the PACKET CHANNEL REQUEST message (with the "cell update" cause). Unfortunately, the network does not know that the mobile station supports the EGPRS, which means that the network has no choice but to allocate a UL TBF in the GPRS mode, as shown at 22', by sending a PACKET UPLINK ASSIGNMENT message. The MS then sends a cell update message to the BSS(new cell) as shown at 23' (in fact this is an empty LLC PDU). The SGSN forwards the cell update message to the BSS(new cell), as shown at 24'. As shown at 25', the SGSN then sends a FLUSH-LL message that commands the BSS(old cell) to reroute LLC PDU(s) not yet transmitted in the downlink direction to the BSS(new cell). The BSS(old cell) then sends a FLUSH-LL ACK acknowledgement message to the SGSN, as shown at 26'. Thus in this second scenario it is possible to distinguish between two situations (note that two situations could also be distinguished in the first scenario, but this was of no consequence in relation to the statement of the problems).

In a first situation (corresponding to the FIG. 3 example) the network can establish the DL TBF (for resumption of the transfer in the downlink direction) on the PACCH of the UL TBF created to send the cell update message. For resumption of the transfer in the downlink direction, the BSS(new cell) then, as shown at 27', sends the MS a PACKET DOWNLINK ASSIGNMENT message advising the MS of the packet mode resources allocated to it, in this instance in the GPRS mode. The transfer can then be resumed, as shown at 28', where a TCP segment having the sequence number "n+2" is transmitted in the downlink direction.

In this first situation, it will therefore be necessary to change the mode for the TBF afterwards, and the only way to do this is to release the UL TBF, release the DL TBF, and then re-establish a DL TBF in the EGPRS mode. The releasing of the UL TBF is illustrated by a state denoted 29'. As shown at 30', during the state 29', the BSS(new cell) sends the MS a PACKET UPLINK ACK/NACK message including in particular a final ACK indicator (FAI) bit equal to 1. As shown by a state 31', the DL TBF is still operative. As shown at 32', during the state 31', a TCP segment having the sequence number "n+3" is sent in the downlink direction, after which the mobile station sends a PACKET CONTROL ACK message to the new cell, as shown at 33'. The releasing of the DL TBF and then the re-establishing of a DL TBF in the EGPRS mode are shown by a state denoted 34'. During the state 34', an RLC data block including a final block indicator (FBI) equal to 1 is sent in the downlink direction, as shown at 35', after which a PACKET DOWNLINK ACK/NACK message including a final ACK indicator (FAI) bit equal to 1 is sent in the uplink direction, as shown at 36'. Once the DL TBF in the GPRS mode has been released, a PACKET DOWNLINK ASSIGNMENT message can then be sent to the mobile station on the PACCH, as shown at 37', this message indicating the packet mode resources allocated to the mobile station in the downlink direction, in this instance in the EGPRS mode. The transfer in the downlink direction is then continued in the EGPRS mode, as shown at 38', and a TCP segment having a sequence number "n+4" is sent in the downlink direction and a TCP ACK having the number "n+3" is sent in the uplink direction.

We have found that the above kind of method is not the optimum since the GPRS mode is used instead of the EGPRS mode some of the time, and furthermore because the change from the GPRS mode to the EGPRS mode wastes time. To be more precise, if T denotes the time necessary to resume the transfer in the downlink direction in the EGPRS mode in the first scenario, in which the mobile station still has one or more LLC PDU(s) to send, and T' denotes the time necessary to resume the transfer in the downlink direction in the EGPRS mode in the second scenario, in which the mobile station has no LLC PDU(s) to send, the time T' can be expressed as follows:

$$T'=T+T1+T2+T3+T4$$

where:

T1 is the time necessary to be sure that the DL TBF has been established successfully, T2 is the time necessary to release the UL TBF, T3 is the average time necessary to transfer half of an LLC PDU on the TBF, and T4 is the time necessary to release the DL TBF with:

T1=RTD+RRBP (where RTD is the round trip time between the BSS and the MS and RRBP is the time needed between an invitation to send, sent by the network, and the response of the mobile station),

T2=RTD+RRBP,

T3=½ T_llc_pdu_transfer (with, for example, T_llc_pdu_transfer=200 ms in the case of a bit rate of 2.5 kbit/s and an LLC PDU size of 500 bytes), and

T4=RTD+RRBP,

Considering typical values RTD=120 ms and RRBP=60 ms, this can in some cases mean that the GPRS mode continues, in place of the EGPRS mode, for at least 60 ms.

In a second situation in the second scenario, not specifically shown in the figures, the network cannot establish the DL TBF on the PACCH of the UL TBF created to send the cell update message but can only establish the DL TBF on the (P)CCCH, and consequently after the release of the UL TBF created for sending the cell update message. In this case, the BSS(new cell) can directly allocate packet mode resources in the EGPRS mode. The BSS(new cell) then knows the capacities of the MS, thanks to corresponding information contained in the BSSGP frames received from the SGSN. However, the method is still not optimum because of the time wasted waiting for the release of the UL TBF before being able to establish the DL TBF on the (P)CCCH.

To summarize, we have become aware that problems arise due to the various scenarios for resuming the transfer in the downlink direction, according to whether the mobile station has LLC PDU(s) in its buffer or not. This leads to incoherent behavior in the case of cell reselection, especially since in the application based on the TCP the two situations can occur (the mobile station has LLC PDU(s) in its buffer or does not have LLC PDU(s) in its buffer), and moreover, as explained above, transfer in the EGPRS mode is resumed with a time-delay in the situation where the mobile station has no LLC PDUs in its buffer.

The example more specifically described hereinabove is the situation of a cell update in the case of cell reselection in the packet transfer mode. Similar problems arise in other examples, in particular the example of packet mode paging. With the current version of the standard, when the network sends a paging request to a mobile station for services in packet mode, the mobile station must respond by means of a CHANNEL REQUEST message (with a cause corresponding to a one phase access) or a PACKET CHANNEL REQUEST message (with a cause corresponding to a paging request response); thus the network will not know if the mobile station supports the EGPRS and will establish a UL TBF in the GPRS mode, even for a mobile station supporting the EGPRS. When the SGSN receives the response from the mobile station, it can start to send LLC PDUs to the correct cell, i.e. a transfer of user data in the downlink correction can then begin, but problems similar to those described above for the cell update situation therefore also arise, since if the UL TBF is still operative, then the DL TBF will initially be established in the GPRS mode.

As we have realized, the problems previously discussed relate generally to any scenario leading a mobile station to require a UL TBF to transfer signaling data, thereafter generating the establishment of a DL TBF for the transfer of user data.

SUMMARY OF THE INVENTION

One object of the present invention is to solve some or all of the above problems. More generally, an object of the present invention is to optimize the procedures of allocating resources in packet mode in the above systems.

In one aspect the present invention provides a method of allocating packet mode resources in a mobile radio system in which a mobile station can send different types of packet mode resource requests to the network, corresponding to different transfer modes that can be supported by the mobile station, a mobile station being able to use one or the other of request types corresponding to transfer modes that it supports, in accordance with its requirements, in which method, for signaling data transfer in the uplink direction, the signaling being liable to generate an allocation of packet mode resources in the uplink direction for user data transfer, a mobile station uses a type of packet mode resource request corresponding to a transfer mode best suited to the requirements of the user data transfer.

In another aspect, the invention provides a method of allocating packet mode resources in a mobile radio system in which a mobile station can send different types of packet mode resource requests to the network, corresponding to different transfer modes that can be supported by the mobile station, a mobile station being able to use one or the other of request types corresponding to transfer modes that it supports, in accordance with its requirements, in which method, for signaling data transfer, a mobile station uses a type of packet mode resource request corresponding to a transfer mode best suited to the requirements of a user data transfer, including a cause specifying signaling data transfer requirements.

According to another feature, different transfer modes supported correspond to different bit rates available.

According to another feature, different bit rates available correspond to different modulation schemes available.

According to another feature, the different transfer modes include a General Packet Radio Service (GPRS) mode and an Enhanced General Packet Radio Service (EGPRS) mode.

According to another feature, one transfer mode best suited to the requirements of user data transfer corresponds to a transfer mode authorizing the highest bit rate.

According to another feature, one transfer mode best suited to the requirements of user data transfer corresponds to the Enhanced General Packet Radio Service (EGPRS) mode.

According to another feature, the signaling data transfer requirements include requirements for transfer of signaling messages in accordance with a mobility management protocol.

According to another feature, the signaling messages include a cell update message sent in the event of cell reselection during a current user data transfer.

According to another feature, the signaling messages include a paging response message in packet mode prior to a transfer of user data in the downlink direction.

According to another feature, the user data transfer includes a transfer of data in accordance with the Transmission Control Protocol (TCP).

According to another feature, one type of packet mode resource request corresponding to a transfer mode best suited to the requirements of said transfer of user data includes a cause specifying said signaling data transfer requirements.

According to another feature, one type of packet mode resource requests corresponding to a transfer mode best suited to the requirements of said transfer of user data and including no cause specifying said signaling data transfer requirements is used for said signaling data transfer requirements.

According to another feature, a message used to transmit a type of packet mode resource request that corresponds to a transfer mode best suited to the requirements of a user data transfer is the EGPRS PACKET CHANNEL REQUEST message.

According to another feature, the EGPRS PACKET CHANNEL REQUEST message includes a cause specifying signaling data transfer requirements.

The invention further provides a mobile station including means for implementing a method according to the invention.

The invention further provides a mobile radio network equipment including means for implementing a method according to the invention.

The invention further provides a mobile radio system including means for implementing a method according to the invention.

Other objects and features of the present invention will become apparent on reading the following description of one embodiment of the invention, which is given with reference to the accompanying drawings.

DETAILED DESCRIPTION OF THE PREFERRED EMBODIMENT

In the example of application to cell reselection in packet transfer mode, the invention proposes authorizing a mobile station to use the EGPRS PACKET CHANNEL REQUEST message in the cell update situation, whether the mobile station has LLC PDU(s) to send after switching to the new cell or not.

This tells the network whether the mobile station supports the EGPRS, which authorizes the network to allocate a UL TBF in the EGPRS mode. The DL TBF, which is preferably established on the PACCH of the UL TBF to accelerate the resumption of transfer, can then be established directly in the EGPRS mode.

Figure 4:
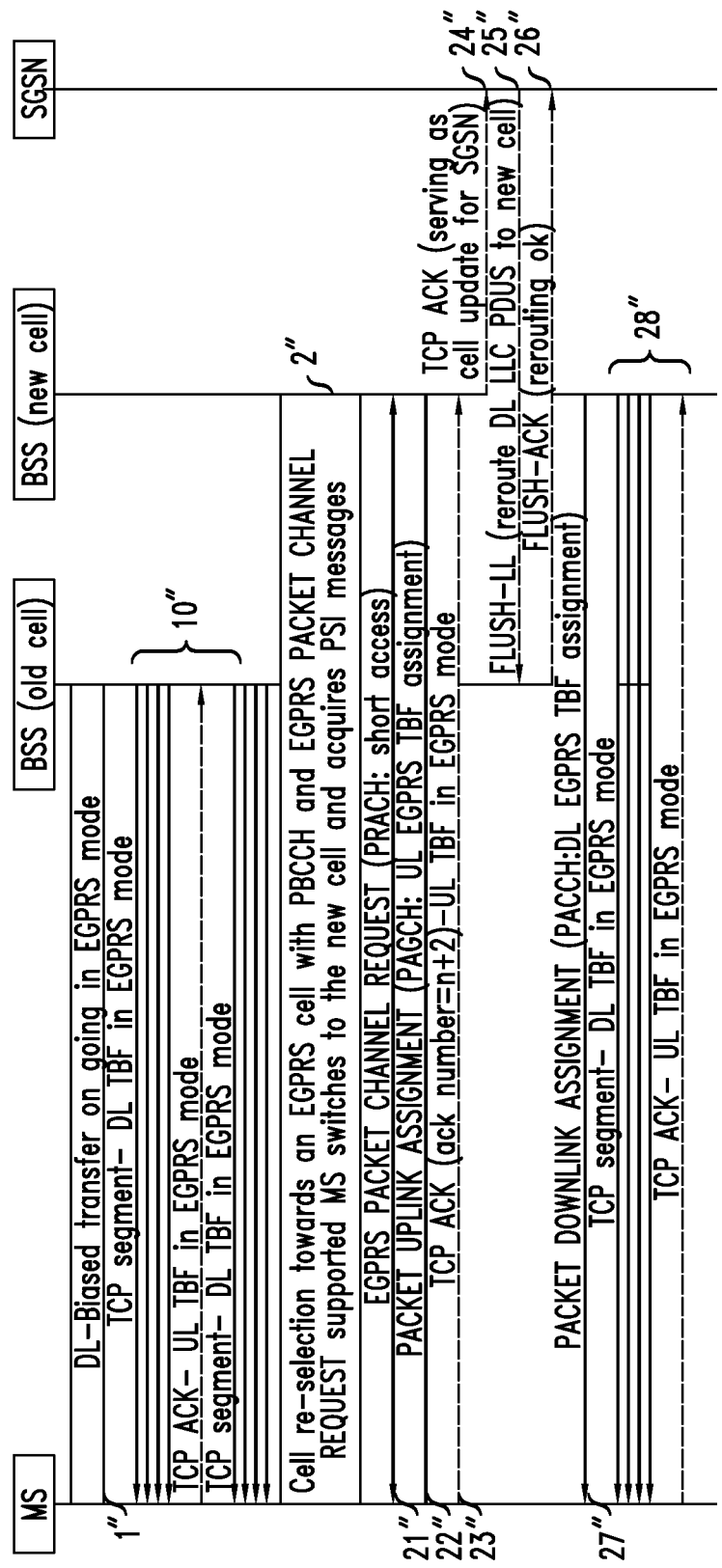
FIG. 4 shows one example of a method according to the invention for resuming data transfer in the event of cell reselection.

FIG. 4 shows an example of a method according to the invention corresponding to application to cell reselection in packet transfer mode.

Figure 1:
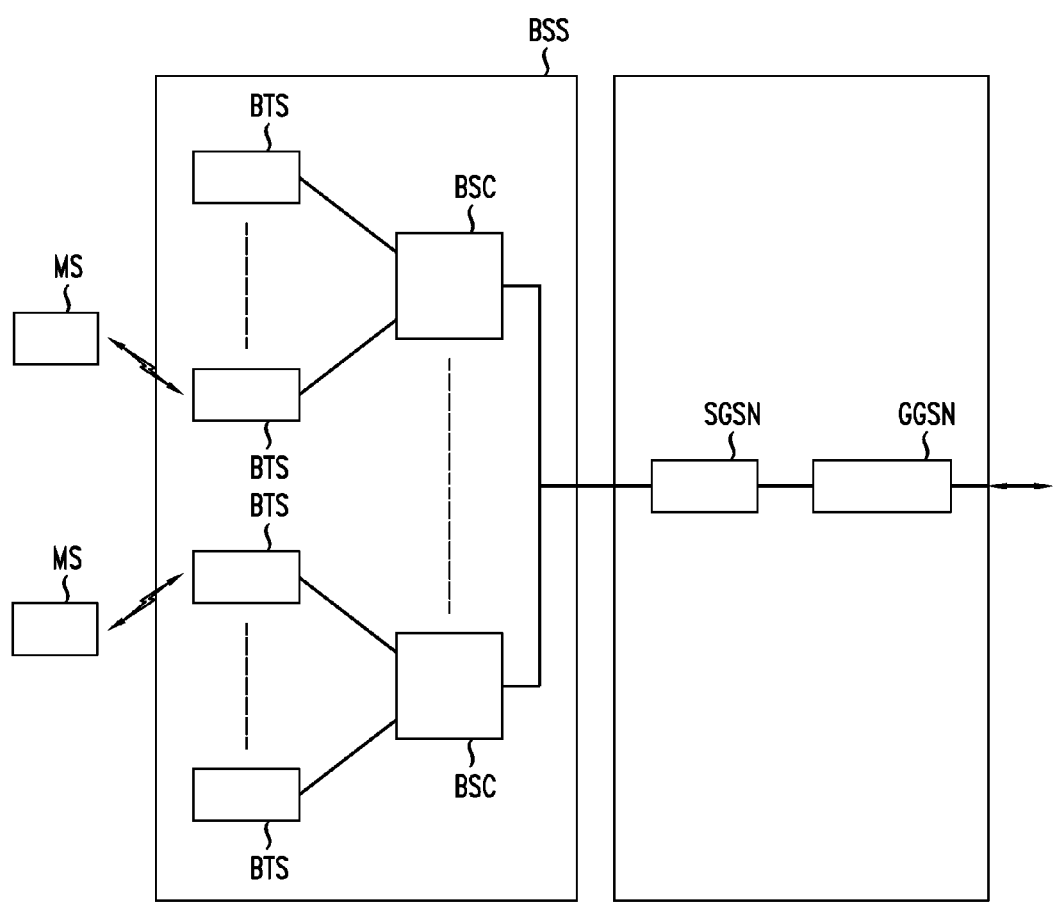
FIG. 1 outlines the general architecture of a packet mode mobile radio system.
Figure 2:
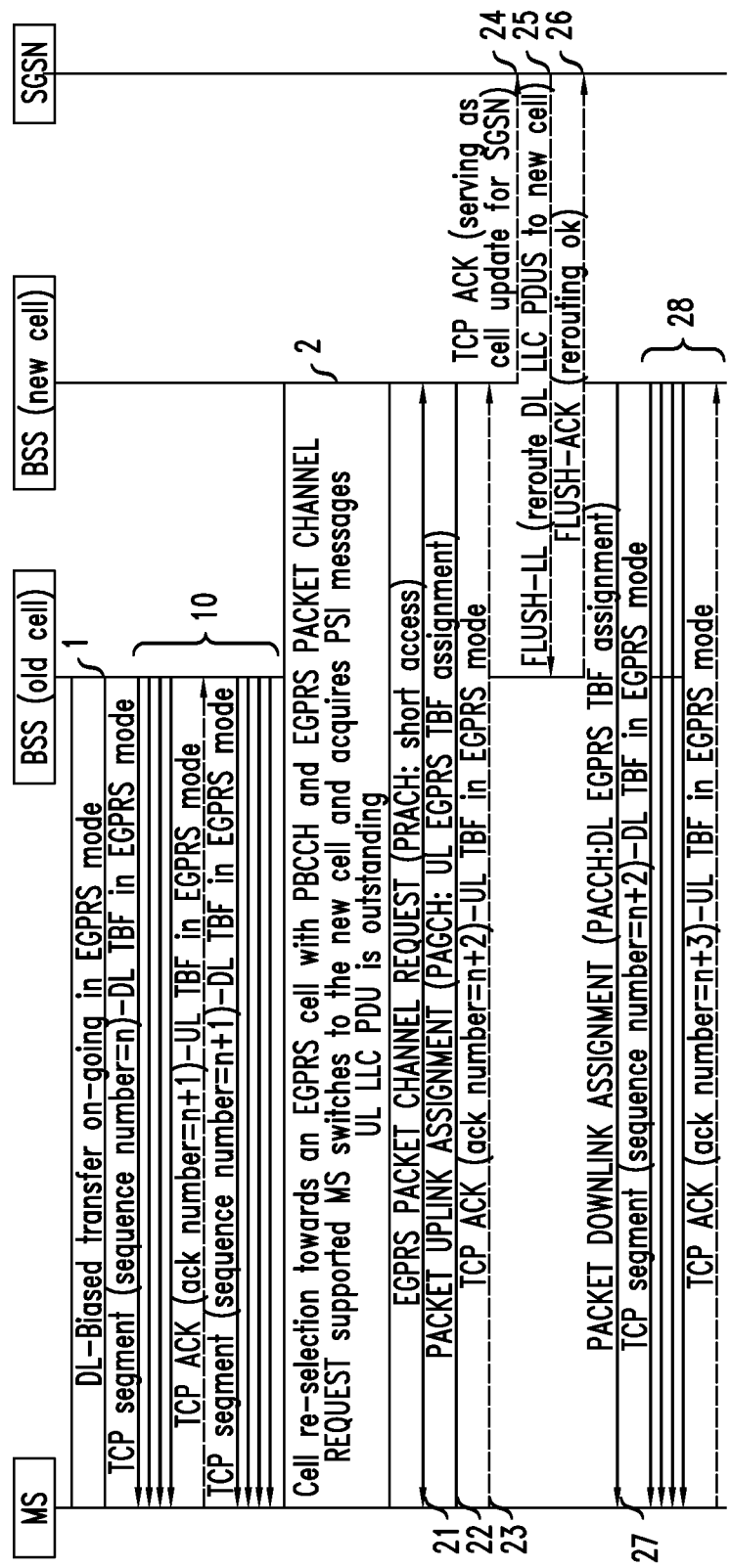
FIGS. 2 and 3 show various procedures that can be used, with the current version of the standard, to resume the transfer of data in the event of cell reselection.
Figure 3:
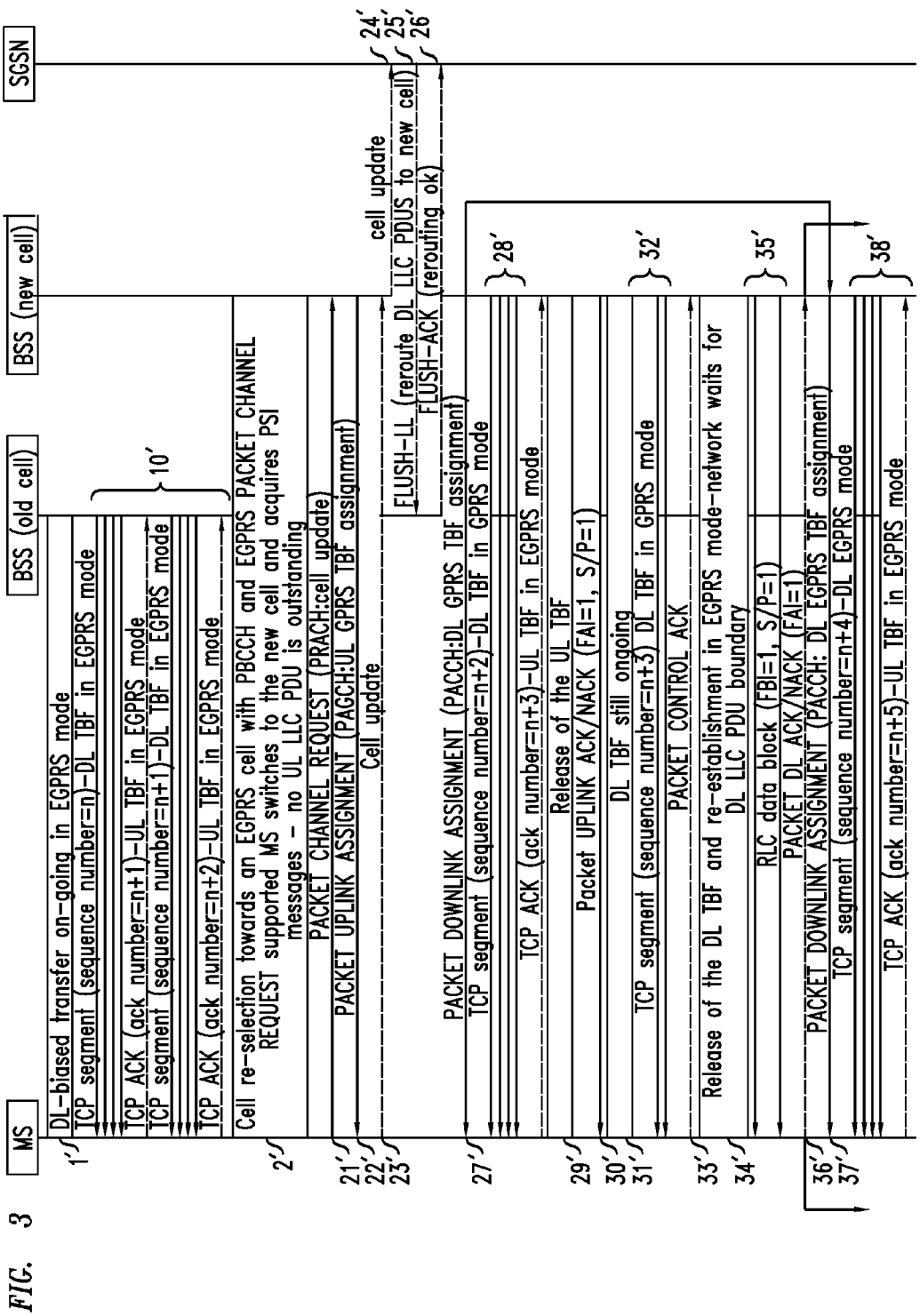

In the FIG. 4 example, an initial state denoted 1" corresponds, as in the example shown in FIGS. 2 and 3, to a data transfer in progress between an equipment denoted MS (mobile station) and an equipment denoted BSS (in this instance the BSS of an old cell: BSS(old cell)), before changing cell. For example, as shown at 10", TCP segments can be transmitted in the downlink direction and TCP ACKs can be transmitted in the uplink direction.

The change of cell situation is then considered. As in the example shown in FIGS. 2 and 3, the situation is one in which the MS has decided on cell reselection and the MS has successfully effected the operations necessary to connect to the new (reselected) cell. The corresponding state is denoted 2" in FIG. 4. As in the example shown in FIGS. 2 and 3, the example is also considered of a new (or reselected) cell which supports the PBCCH and the EGPRS PACKET CHANNEL REQUEST message.

In the example shown, the invention proposes that the MS send the network an EGPRS PACKET CHANNEL REQUEST message, as shown at 21", whether the MS has one or more LLC PDUs to send to the network or not (corresponding in particular to TCP ACKs that could not be sent in the old cell). The BSS(new cell) then knows that the MS supports the EGPRS. The BSS(new cell) can then allocate a UL TBF in the EGPRS mode, as shown at 22", for sending a PACKET UPLINK ASSIGNMENT message, and can then resume the transfer in the downlink direction in the EGPRS mode.

The resumption of the transfer can then be effected by means of steps 23" to 28" similar to the steps 23 to 28 shown in FIG. 2.

As previously indicated, the invention is not limited to the application to cell reselection in packet transfer mode. Generally speaking, the invention applies to any mobile radio system in which a mobile station can send different types of packet mode resource requests to the network, corresponding to different transfer modes that the mobile station may support, and in which a mobile station can use one or the other type of request corresponding to modes of transfer that it supports, in accordance with its requirements. According to one of its various aspects, the invention proposes that, for the transfer of signaling data in the uplink direction, said signaling being liable to generate an allocation of resources in packet mode in the downlink direction for the transfer of user data, a mobile station uses a type of packet mode resource request corresponding to a transfer mode that is best suited for the requirements of said transfer of user data.

Various modes of transfer supported correspond in particular to various available bit rates.

Various available bit rates correspond in particular to various available modulation schemes.

In particular, the various transfer modes include the General Packet Radio Service (GPRS) mode and the Enhanced General Packet Radio Service (EGPRS) mode.

For example, one transfer mode best suited to the requirements of transfer of user data corresponds to a transfer mode authorizing the highest bit rates.

For example, one transfer mode best suited to the requirements of transfer of user data corresponds to the Enhanced General Packet Radio Service (EGPRS) mode.

For example, said signaling data transfer requirements include requirements for transfer of signaling messages in accordance with a mobility management protocol.

For example, said signaling messages include a cell update message sent in the event of cell reselection during a current user data transfer.

For example, said signaling messages include a paging request response message in packet mode prior to a transfer of user data in the downlink direction.

In accordance with another aspect of the invention, various options are available for introducing the base station concept in accordance with the invention into the standard relating to the GSM/GPRS system.

One option is for new causes to be introduced into the EGPRS PACKET CHANNEL REQUEST message, such as the cell update cause and paging response cause. It can then be specified that the mobile station can or must use one of those causes when the cell supports the EGPRS PACKET CHANNEL REQUEST message and when the mobile station wishes to send signaling data, such as in particular a cell update following cell reselection during a data transfer (and the mobile station has no LCC PDU(s) to send to the network), or a page response in packet mode.

Another option is for a mobile station supporting the EGPRS to be authorized to use one of the existing causes provided in the EGPRS PACKET CHANNEL REQUEST message (in particular a cause corresponding to a short access or a one phase access) when it wishes to send signaling data, such as in particular a cell update or a page response in packet mode.

More generally, one option is for a type of packet mode resource request corresponding to a transfer mode best suited to the requirements of a user data transfer to include a cause specifying signaling data transfer requirements. Another option is for a type of packet mode resource request corresponding to a transfer mode best suited to the requirements of said user data transfer and including no cause specifying said signaling data transfer requirements to be used for said signaling data transfer requirements. For example, said message used to transfer said request type is the EGPRS PACKET CHANNEL REQUEST message.

In addition to the above method, the present invention provides a mobile station, a mobile radio network equipment, and a mobile radio system including means for implementing the method.

The specific implementation of such means presenting no particular problem for the person skilled in the art, such means do not need to be described here in more detail than by stating their function, as previously.

The invention claimed is:

1. A mobile station, wherein:
   said mobile station being adapted to send toward a network, depending on needs of the mobile station, a packet-mode resource request, said packet-mode resource request being one of at least two types corresponding to different transfer modes that the mobile station supports, wherein a first type corresponds to a first transfer mode that indicates GPRS (General Packet Radio Service) and a second type corresponds to a second transfer mode that indicates EGPRS (Enhanced General Packet Radio Service),
   wherein the needs of the mobile station include one of user data transfer needs and signaling data transfer needs, and
   further wherein when said mobile station has signaling data transfer needs for at least one of a page response, a cell update, or Mobility Management signaling, said packet-mode resource request indicates EGPRS mode and specifies the signaling data transfer needs.

2. The mobile station as recited in claim 1, wherein the signaling data transfer needs are specified by cause data.

3. The mobile station as recited in claim 1, wherein a message used to transmit the packet-mode resource request corresponding to EGPRS mode is an EGPRS PACKET CHANNEL REQUEST message.

4. A mobile station, wherein:
    said mobile station being adapted to send toward a network, depending on needs of the mobile station, a packet-mode resource request, said packet-mode resource request being one of at least two types corresponding to different transfer modes that the mobile station supports, wherein a first type corresponds to a first transfer mode and a second type corresponds to an enhanced form of the first transfer mode,
    wherein the needs of the mobile station include one of user data transfer needs and signaling data transfer needs, and
    further wherein when said mobile station has signaling data transfer needs for at least one of a page response, a cell update, or Mobility Management signaling, said packet-mode resource request indicates the enhanced form of the first transfer mode and specifies the signaling data transfer needs.

5. The mobile station as recited in claim 4, wherein the first transfer mode corresponds to GPRS (General Packet Radio Service) and the enhanced form of the first transfer mode corresponds to EGPRS (Enhanced General Packet Radio Service).

6. The mobile station as recited in claim 4, wherein the signaling data transfer needs are specified by cause data.

7. The mobile station as recited in claim 5, wherein a message used to transmit the packet-mode resource request corresponding to EGPRS mode is an EGPRS PACKET CHANNEL REQUEST message.

8. A mobile station, wherein:
    said mobile station being adapted to transmit to the network different types of packet-mode resource requests corresponding to different transfer modes that the mobile station supports, the different transfer modes including GPRS (General Packet Radio Service) and EGPRS (Enhanced General Packet Radio Service) modes;
    the mobile station using one of the types of requests that correspond to the transfer modes that it supports, depending on its needs, wherein the needs of the mobile station include one of user data transfer needs and signaling data transfer needs,
    the mobile station using, when said mobile station has signaling data transfer needs for at least one of a page response, a cell update, or Mobility Management signaling, a type of packet-mode resource request corresponding to EGPRS mode, including a cause specifying signaling data transfer needs.

9. The mobile station as recited in claim 8, wherein a message used to transmit the packet-mode resource request corresponding to EGPRS mode is an EGPRS PACKET CHANNEL REQUEST message.

* * * * *